United States Patent [19]

Yoshizawa et al.

[11] Patent Number: 5,139,552
[45] Date of Patent: Aug. 18, 1992

[54] APPARATUS FOR BENDING AND TEMPERING SHEET GLASS

[75] Inventors: Hideo Yoshizawa; Toru Kasugai, both of Osaka, Japan

[73] Assignee: Nippon Sheet Glass Co., Ltd., Osaka, Japan

[21] Appl. No.: 622,731

[22] Filed: Dec. 5, 1990

[30] Foreign Application Priority Data

Dec. 5, 1989 [JP] Japan .................. 1-316277
Dec. 8, 1989 [JP] Japan .................. 1-320203
Dec. 19, 1989 [JP] Japan .................. 1-328949

[51] Int. Cl.$^5$ ............................................. C03B 27/04
[52] U.S. Cl. .............................. 65/273; 65/103; 65/114; 65/348; 65/351
[58] Field of Search .............. 65/348, 351, 273, 287, 65/103, 106, 114, 289

[56] References Cited

U.S. PATENT DOCUMENTS

| | | | |
|---|---|---|---|
| 3,123,459 | 3/1964 | Hens | 65/106 |
| 3,249,415 | 5/1966 | McMaster et al. | 65/160 |
| 3,293,021 | 12/1966 | Stilley et al. | 65/111 |
| 3,365,286 | 1/1968 | Nedelec | 65/114 |
| 3,529,947 | 9/1970 | Frank | 65/104 |
| 3,554,724 | 1/1971 | Ritter, Jr. et al. | 65/107 |
| 3,573,022 | 3/1971 | Frank | 65/104 |
| 3,582,304 | 6/1971 | Bognar | 65/105 |
| 3,595,636 | 7/1971 | Posney | 65/287 |
| 3,634,059 | 1/1972 | Miller | 65/273 |
| 3,676,098 | 7/1972 | Hall | 65/106 |
| 3,744,985 | 7/1973 | Peternel | 65/104 |
| 3,827,872 | 8/1974 | Augustin et al. | 65/114 |
| 3,955,955 | 5/1976 | Melling | 65/104 |
| 4,043,782 | 8/1977 | Bamford et al. | 65/104 |
| 4,071,344 | 1/1978 | Blausey, Jr. | 65/29 |
| 4,071,345 | 1/1978 | Werner et al. | 65/273 |
| 4,305,746 | 12/1981 | Hagedorn et al. | 65/106 |
| 4,396,410 | 8/1983 | Hagedorn et al. | 65/106 |
| 4,488,846 | 12/1984 | Halberschmidt et al. | 414/152 |
| 4,615,931 | 10/1986 | Matsuyoshi et al. | 428/174 |
| 4,749,399 | 6/1988 | Yamada | 65/348 X |
| 4,756,735 | 7/1988 | Cathers et al. | 65/106 |
| 4,767,439 | 8/1988 | Reunamäki | 65/351 |
| 4,826,522 | 5/1989 | d'Iribarne et al. | 65/115 |
| 4,840,657 | 6/1989 | Orain | 65/107 |
| 4,973,344 | 11/1990 | Rahrig et al. | 65/288 |

FOREIGN PATENT DOCUMENTS

| | | |
|---|---|---|
| 799907 | 11/1968 | Canada . |
| 0053551 | 6/1982 | European Pat. Off. . |
| 0143691A3 | 6/1985 | European Pat. Off. . |
| 0277074A1 | 8/1988 | European Pat. Off. . |
| 0361263A2 | 4/1990 | European Pat. Off. . |
| 0404676A1 | 12/1990 | European Pat. Off. . |
| 2336513 | 7/1973 | Fed. Rep. of Germany . |
| 3344083C1 | 10/1984 | Fed. Rep. of Germany . |
| 1580305 | 9/1969 | France . |
| 2164455 | 12/1971 | France . |
| 2112115 | 6/1972 | France . |
| 59-213635 | 12/1984 | Japan . |
| 61-17775 | 5/1986 | Japan . |
| 61-28611 | 7/1986 | Japan . |
| 62-18488 | 4/1987 | Japan . |
| 62-40298 | 8/1987 | Japan . |
| 63-43324 | 8/1988 | Japan . |
| 63-260833 | 10/1988 | Japan . |
| 63-63493 | 12/1988 | Japan . |
| WO89/07581 | 8/1989 | PCT Int'l Appl. . |
| 782502 | 9/1957 | United Kingdom . |
| 2011377 | 7/1979 | United Kingdom . |
| 2162170A | 1/1986 | United Kingdom . |
| 2166133A | 4/1986 | United Kingdom . |
| 2185974A | 8/1987 | United Kingdom . |
| 2188045A | 9/1987 | United Kingdom . |

OTHER PUBLICATIONS

English abstract for Japanese Patent Publication No. 59-213635.
English abstract for Japanese Patent Publication No. 62-18488.
English abstract for Japanese Patent Publication No. 62-40298.
English abstract for Japanese Patent Publication No. 63-43324.
English abstract for French Patent No. 2.164.455.

*Primary Examiner*—Robert L. Lindsay
*Attorney, Agent, or Firm*—Merchant, Gould, Smith, Edell, Welter & Schmidt

[57] ABSTRACT

A glass sheet such as an automobile window glass sheet is bent to shape and tempered at one stage by a sheet glass bending and tempering apparatus. The sheet glass bending and tempering apparatus has solid contact members for pressing a glass sheet, which has been heated nearly to its softening point, to a desired shape and depriving the glass sheet of heat to cool the glass sheet quickly, the solid contact means having a contact surface for contacting the glass sheet and depriving the glass heat of heat therethrough. The contact surface has a plurality of grooves defined therein, and a plurality of air outlet ports defined in each of the grooves, for applying cooling air to the glass sheet, and a plurality of air inlet ports defined in each of the grooves, for drawing the air applied to the glass sheet. When the opposite surfaces of the glass sheet are pressed by the solid contact members, the pressure is temporarily reduced and then increased again to cool the glass sheet. The peripheral edge of the glass sheet, which requires a high degree of shaping accuracy, is cooled quickly by the solid contact members, and the central region of the glass sheet, which requires high optical properties, is cooled quickly by air jets.

8 Claims, 8 Drawing Sheets

APPARATUS FOR BENDING AND TEMPERING SHEET GLASS

BACKGROUND OF THE INVENTION

1. Field of the Invention

The present invention relates to a method of and an apparatus for bending and tempering a sheet of glass, especially for use as an automobile window glass sheet, at one stage.

2. Description of the Relevant Art

One general process for tempering a sheet of glass employs air jets which are applied to the glass sheet over its surface. Other glass sheet tempering methods include a process in which a sheet of glass to be tempered is submerged in a liquid, and a process in which a solid contact member made of a material of good thermal conductivity, such as boron nitride, stainless steel, or the like, is held against a sheet of glass to deprive the contacted glass surface of heat.

Japanese Patent Publication No. 62(1987)-40298, for example, discloses an air jet process. According to the disclosed process, a sheet of glass to be tempered is not constrained after it is bent until it is rapidly cooled, and hence the glass sheet tends to be deformed. When a glass sheet is bent to a greater curvature, it is more liable to get deformed.

The solid member contact method is disclosed in Japanese Patent Publications Nos. 62(1987)-18488 and 63(1988)-43324 and Japanese Laid-Open Patent Publications Nos. 59(1984)-213635 and 63(1988)-260833, for example. According to the method disclosed in Japanese Patent Publication No. 62(1987)-18488, a metallic cooling plate for contacting a sheet of glass is divided or has a groove to reduce any thermal expansion thereof due to a temperature rise. The process disclosed in Japanese Patent Publication No. 63(1988)-43324 employs a main cooling device for cooling a sheet of glass with air jets after the glass sheet is preliminarily cooled by contact with a solid contact member.

The method shown in Japanese Patent Publication No. 62(1987)-18488 is disadvantageous in that the glass sheet cannot uniformly be cooled, a drawback which is inherent with the solid member contact process. According to the process shown in Japanese Patent Publication No. 63(1988)-43324, since the glass sheet is cooled in two steps, the overall apparatus required to carry out the method is large in size, and when the glass sheet is bent, it tends to be deformed while being fed after it is preliminarily cooled.

In order to deprive a glass sheet of heat quickly in the solid member contact method, it is necessary to press the solid contact member against the glass sheet relatively strongly. When the glass sheet which has been heated nearly to its softening point is cooled, the glass sheet shrinks to a certain degree. Therefore, if the glass sheet remains to be gripped under pressure by the solid contact member, tensile stresses are developed in the glass sheet owing to the shrinkage caused when the glass sheet is cooled. If the tensile stresses exceed the mechanical strength of the glass sheet, then the glass sheet will crack.

SUMMARY OF THE INVENTION

It is an object of the present invention to provide a method of and an apparatus for bending and tempering a sheet of glass so that the bent and tempered sheet of glass is of uniform mechanical strength, shaped with high accuracy, and has reduced optical defects.

According to the present invention, there is provided an apparatus for shaping and tempering a glass sheet, comprising solid contact means for pressing a glass sheet, which has been heated nearly to a softening point thereof, to a desired shape and depriving the glass sheet of heat to cool the glass sheet quickly, the solid contact means having a contact surface for contacting the glass sheet and depriving the glass heat of heat therethrough, the contact surface having a plurality of grooves defined therein, and a plurality of air outlet ports defined in each of the grooves, for applying cooling air to the glass sheet, and a plurality of air inlet ports defined in each of the grooves, for drawing the air applied to the glass sheet. The glass sheet is cooled by both the solid contact means and the cooling air, and hence is cooled uniformly over its entire surface.

When the opposite surfaces of the heated glass sheet are pressed by the solid contact members, the pressure is temporarily reduced and then increased again to cool the glass sheet. Because the pressure with which the glass sheet is pressed by the solid contact means is temporarily lowered, tensile stresses produced in the glass sheet due to shrinkage thereof when the glass sheet is cooled are released.

The peripheral edge of the glass sheet, which requires a high degree of shaping accuracy, is cooled quickly by the solid contact members, and the central region of the glass sheet, which requires high optical properties, is cooled quickly by air jets.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Like or corresponding parts are denoted by like or corresponding parts throughout views.

A sheet glass bending and tempering apparatus according to a first embodiment of the present invention will be described below with reference to FIGS. 1 through 5.

Figure 1:
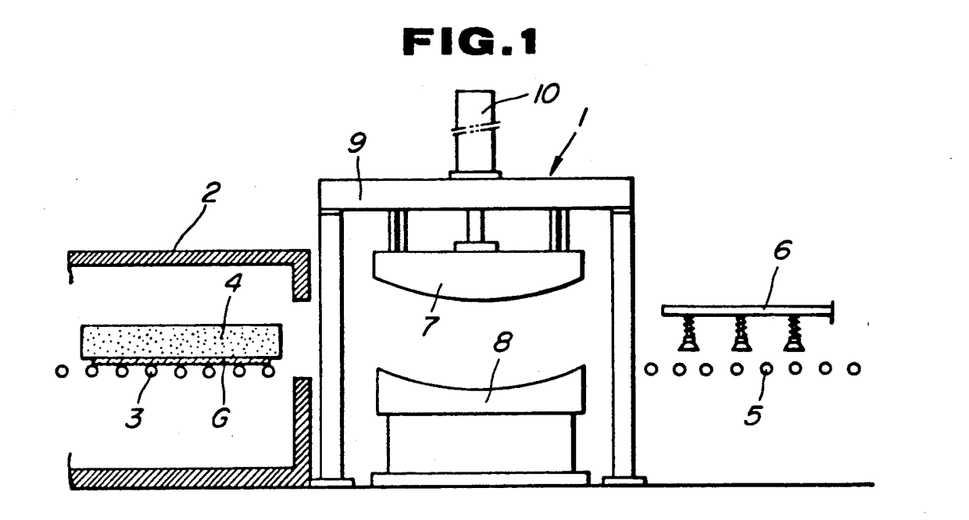
FIG. 1 is a front elevational view of a sheet glass bending and tempering apparatus according to a first embodiment of the present invention.

The sheet glass bending and tempering apparatus, generally denoted at 1, is disposed adjacent to and downstream of a heating furnace 2 which houses feed rolls 3 for feeding a glass sheet G. The glass sheet G is heated nearly to its softening point while it is being fed in the heating furnace 2. The heated glass sheet G is attracted by a flat suction pad 4 under suction, and delivered from the heating furnace 2 into the sheet glass bending and tempering apparatus 1. The sheet glass bending and tempering apparatus 1 is followed by feed rolls 5 which feed a bent and tempered glass sheet G to a next process. The bent and tempered glass sheet G is transferred from the sheet glass bending and tempering apparatus 1 onto the feed rolls 5 by a suction assembly 6.

The glass sheet bending and tempering apparatus 1 includes a bending mold device having an upper convex mold member 7 and a lower concave mold member 8. The upper convex mold member 7 is vertically movably supported on a frame 9 by a cylinder unit 10 mounted on an upper member of the frame 9. The lower concave mold member 8 is fixedly mounted on a floor below the upper convex mold member 7. However, the lower concave mold member 8 may be vertically movably mounted on the floor, and may be combined with a ring mold (not shown).

Each of the convex and concave mold members 7, 8 serves as a solid contact member in the sold member contact process. The convex and concave mold members 7, 8 are pressed against a glass sheet G to shape the same to a bent configuration and also to deprive the contacted class sheet surfaces of heat, thereby tempering the glass sheet G.

Figure 2:
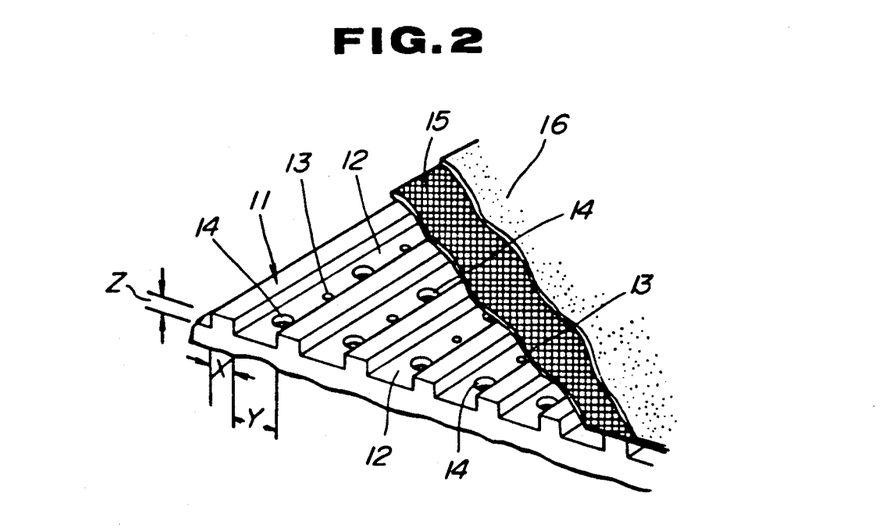
FIG. 2 is an enlarged fragmentary perspective view of a contact layer of a shaping mold member as a solid contact member.

As shown in FIG. 2, each of the convex and concave mold members 7, 8 has an integral contact surface 11 for contacting the glass sheet G, the contact surface 11 having a plurality of parallel grooves 12 defined therein. The contact surface 11 also has alternate air outlet ports 13 and air inlet ports 14 defined therein and opening into each of the grooves 12. The air outlet ports 13 are connected to a source of air under pressure by suitable means such as pipes. The contact surface 11 is fully covered with a mesh-like metallic sheet 15 and a surface member 16.

Figure 4:
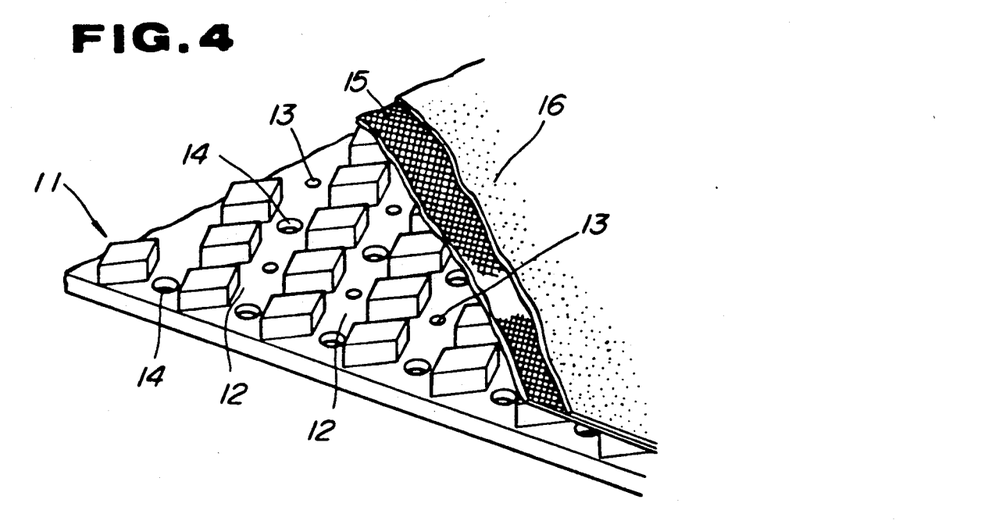
FIG. 4 is an enlarged fragmentary perspective view of a solid contact member according to a modification.

The grooves 12 may be defined in the contact surface 11 such that they intersect as shown in FIG. 4. In FIG. 4, one set of parallel grooves 12 and another set of parallel grooves 12 extend across each other at a given angle in a grid-like pattern.

As shown in FIG. 2, the contact surface 11 has a plurality of parallel narrow raised ridges or lands defined between the grooves 12, for contact with the glass sheet G. Each of these ridges or lands has a width X ranging from 0.5 mm to 10 mm. Each of the grooves 12 has a width Y ranging from 2 mm to 15 mm, and a depth Z ranging from 1 mm to 6 mm. These dimensions of the contact surface 11 are effective to cool the glass sheet 6 uniformly while preventing the glass sheet G from being deformed. It is preferable that air jets ejected from the air outlet ports 13 be applied obliquely and uniformly to the surface of the glass sheet G, so that the glass sheet G will uniformly be cooled without any localized excessive cooling. The air which is applied from the air outlet ports 13 to the glass sheet G and is heated thereby is drawn into the air inlet ports 14. Therefore, the glass sheet G can effectively be cooled within a short period of time.

The mesh-like metallic sheet 15 should preferably have a mesh size ranging from 100 to 400 mesh in terms of the number of openings per square inch. If the mesh size were smaller than 100 mesh, then the mesh mark would be left on the glass sheet surface, and if the mesh size were greater than 400 mesh, the metallic sheet 15 would block the flow of air. The metallic sheet 15 and the surface member 16 may not be superposed, but are more effective when superposed. The surface member 16 should preferably be a woven or felt layer of glass fibers, ceramic fibers, carbon fibers, metallic fibers, aramid fibers, or the like, the layer or felt having a thickness ranging from 0.3 mm to 0.5 mm.

Operation of the bending and tempering apparatus 1 will be described below with reference to FIGS. 3a through 3g.

Figure 3A:
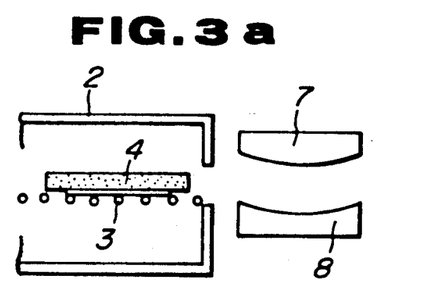
FIGS. 3a through 3g are schematic views showing a progressive process of operation of the sheet glass bending and tempering apparatus shown in FIG. 1.
Figure 3B:
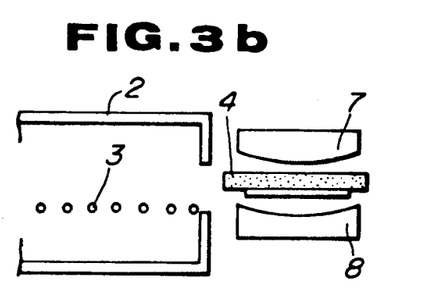
Figure 3C:
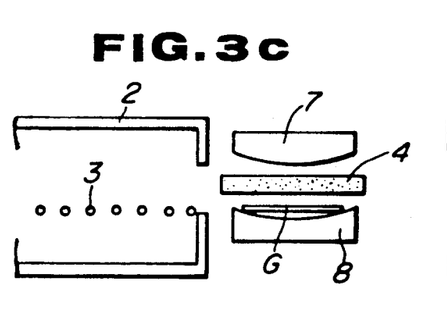
Figure 3D:
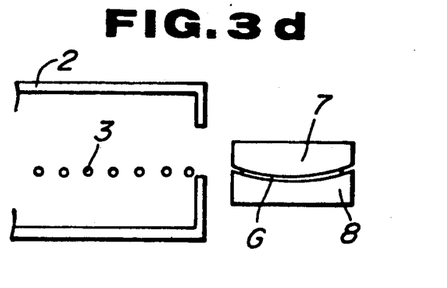
Figure 3E:
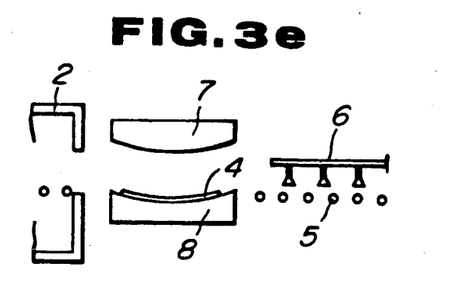
Figure 3F:
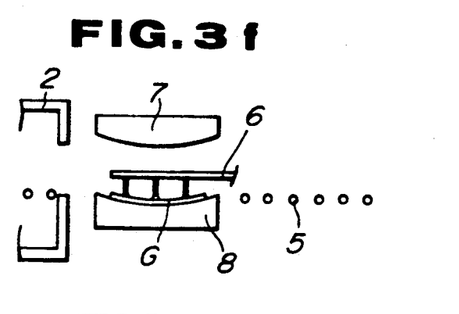
Figure 3G:
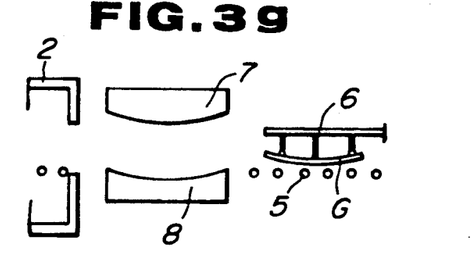

As shown in FIG. 3a, a heated glass sheet G in the heating furnace 2 is attracted by the flat suction pad 4 under suction. The glass sheet G is then transferred from the heating furnace 2 into a position between the convex and concave mold members 7, 8 of the bending and tempering apparatus 1 as shown in FIG. 3b. The glass sheet G is placed on the concave mold member 8 as shown in FIG. 3c. Thereafter, as shown in FIG. 3d, the glass sheet G is pressed to a bent shape by and between the convex and concave mold members 7, 8, while at the same time the contacted surfaces of the glass sheet G are deprived of heat, so that the glass sheet G is quickly cooled. At the same time, cooling air jets are applied from the air outlet ports 13 to the surfaces of the glass sheet G, and the heated air is drawn into the air inlet ports 14. The glass sheet G is now tempered. Thereafter, the convex and concave mold members 7, 8 are moved away from each other as shown in FIG. 3e. The suction assembly 6 is then inserted between the convex and concave members 7, 8 as shown in FIG. 3f, after which the glass sheet G is attracted by the suction assembly 6 and transferred from between the convex and concave mold members 7, 8 onto the feed rolls 5 as shown in FIG. 3g.

Figure 5:
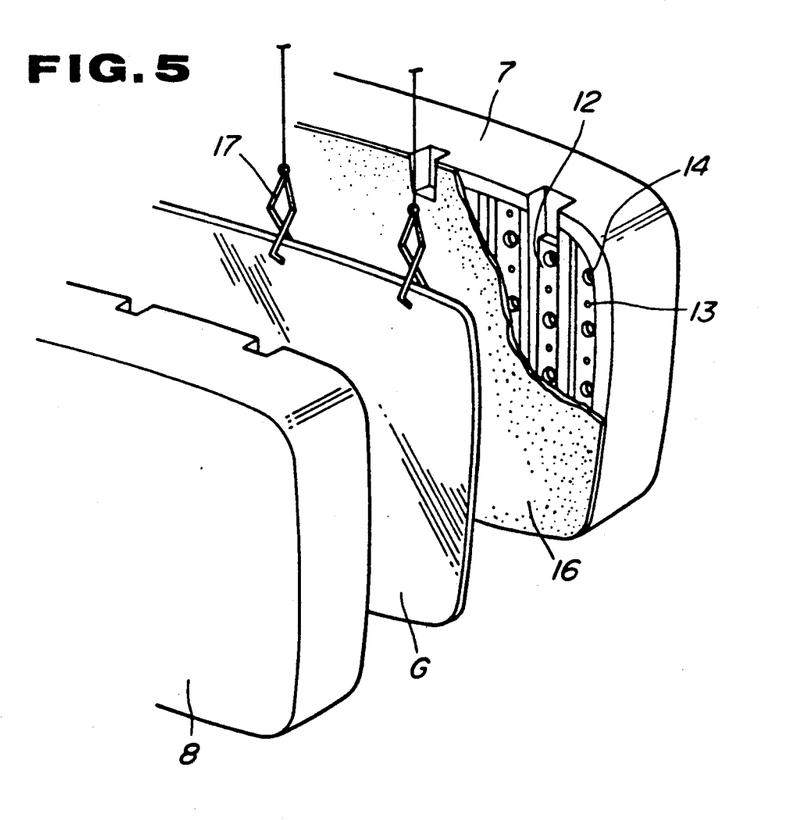
FIG. 5 is a fragmentary perspective view showing the manner in which a suspended sheet of glass is bent and cooled.

While the glass sheet G is horizontally placed between the upper and lower mold members in FIG. 1, the glass sheet G may be vertically suspended by tongues 17 and bent and cooled while being held in the vertically suspended condition.

Figure 6:
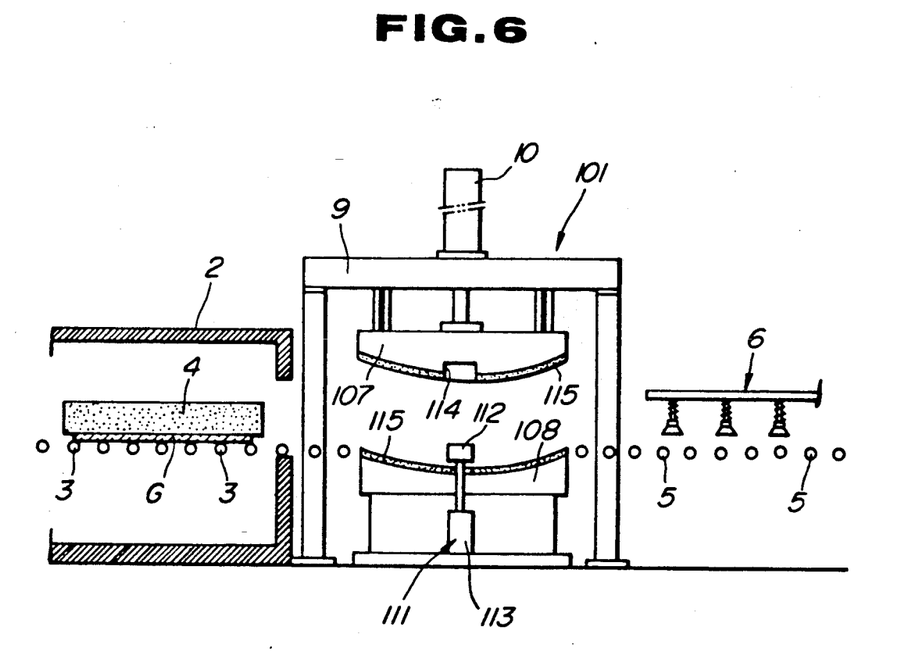
FIG. 6 is a front elevational view of a sheet glass bending and tempering apparatus according to a second embodiment of the present invention.

FIG. 6 shows a sheet glass bending and tempering apparatus according to a second embodiment of the present invention. Those parts in FIG. 6 which are identical to those in FIG. 1 are designated by identical reference numerals.

The sheet glass bending and tempering apparatus, generally denoted at 101, has an upper convex mold member 107 and a lower concave mold member 108. A clamp unit 111 is disposed on one side of the concave mold member 108. The clamp unit 111 has a clamp 112 vertically movable by a cylinder unit 113. When the clamp 112 is lowered, it presses a central region of a glass sheet G at one side thereof against the concave mold member 108. The convex mold member 107 has a recess 114 defined in one side thereof for receiving the clamp 112 when the glass sheet G is shaped between the mold members 107, 108 and clamped down against the concave mold member 108 by the clamp 112.

The convex and concave mold members 107, 108 have respective contact surface layers 115 extending fully over their confronting surfaces. Each of the contact surface layers 115 comprises a woven or felt layer. However, each contact surface layer 115 may have the same structure as shown in FIG. 2 or 4, so that the surfaces of the glass sheet G can be cooled by both the contact surface layers 115 and air jets.

Operation of the glass sheet bending and tempering apparatus 101 will be described below with reference to FIGS. 7a through 7e.

Figure 7A:
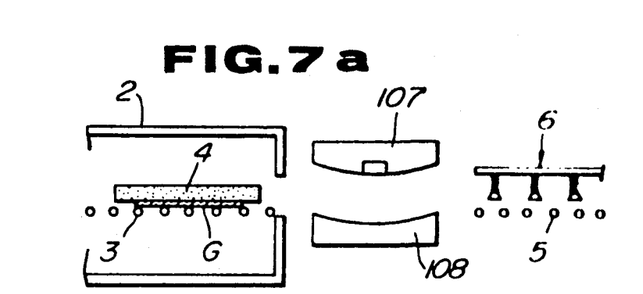
FIGS. 7a through 7e are schematic views showing a progressive process of operation of the sheet glass bending and tempering apparatus shown in FIG. 6.
Figure 7B:
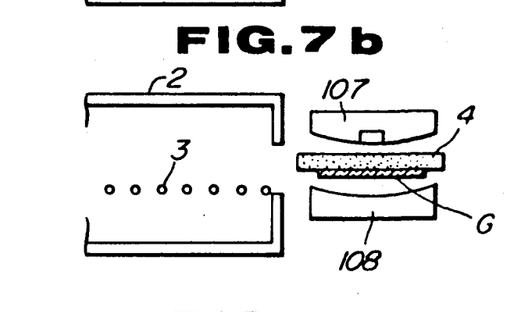
Figure 7C:
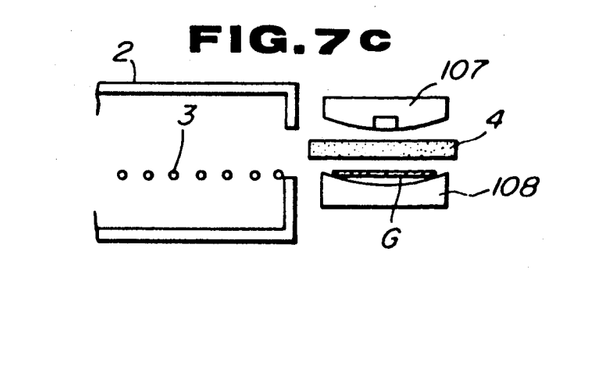
Figure 7D:
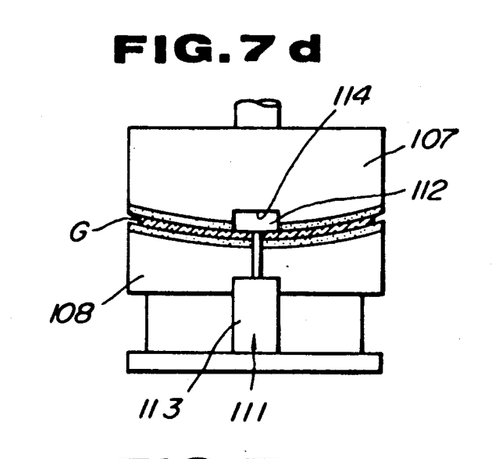

As shown in FIG. 7a, a glass sheet G in the heating furnace 2 is attracted by the flat suction pad 4 under suction. Then, the glass sheet G is transferred into a position between the convex and concave mold members 107, 108 as shown in FIG. 7b, and placed on the concave mold member 108 as shown in FIG. 7c. Thereafter, as shown in FIG. 7d, the glass sheet G is pressed to a bent shape by and between the convex and concave mold members 107, 108, while at the same time the contacted surfaces of the glass sheet G are deprived of heat, so that the glass sheet G is cooled quickly and hence tempered. At this time, the glass sheet G is clamped down against the concave mold member 108 by the clamp 112 of the clamp unit 111.

Upon elapse of 2 to 10 seconds after the glass sheet G has started to be pressed, the pressure applied to the glass sheet G is lowered. The period of time consumed after the glass sheet G has started to be pressed until the pressure applied to the glass sheet G is lowered, should be selected such that tensile stresses produced in the glass sheet G upon cooling thereof will not exceed the mechanical strength of the glass sheet G.

Figure 7E:
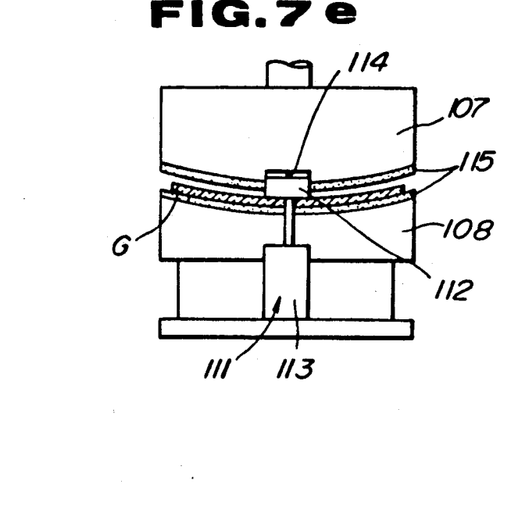

When the pressure is lowered as described above, the glass sheet G slides over the surface of the concave mold member 108 under the tensile stresses as shown in FIG. 7e, whereupon the tensile stresses are released. At this time, the glass sheet G is prevented from being positionally displaced by the clamp unit 111 which holds a side portion of the glass sheet G on the concave mold member 108. Thereafter, the pressure is increased again. If the glass sheet G is suspended by the tongues 17 shown in FIG. 5 and bent in the vertically suspended condition, then the glass sheet G is held in position by the tongues 17. In the second embodiment, the glass sheet G is both bent and cooled quickly. However, the glass sheet G may not be bent but may only be cooled quickly.

Figure 8:
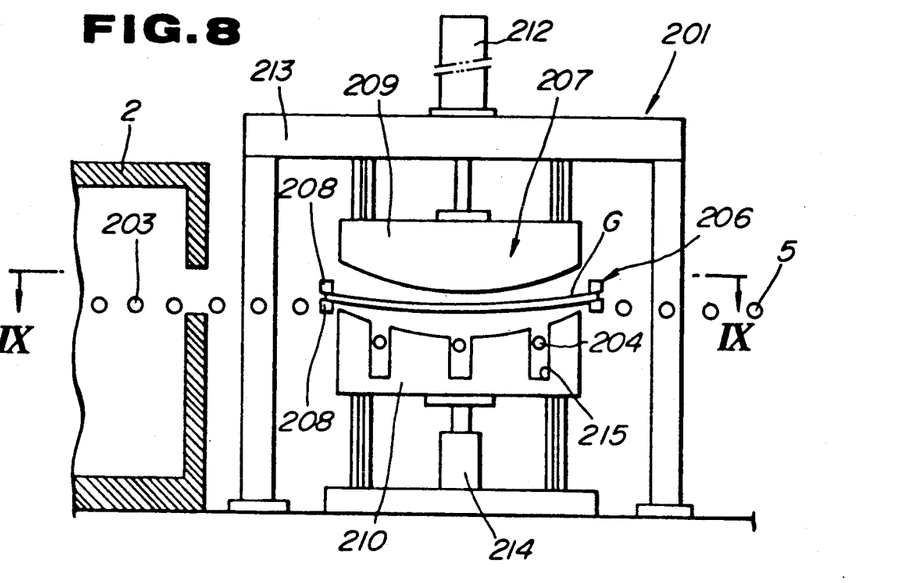
FIG. 8 is a front elevational view of a sheet glass bending and tempering apparatus according to a third embodiment of the present invention.
Figure 9:
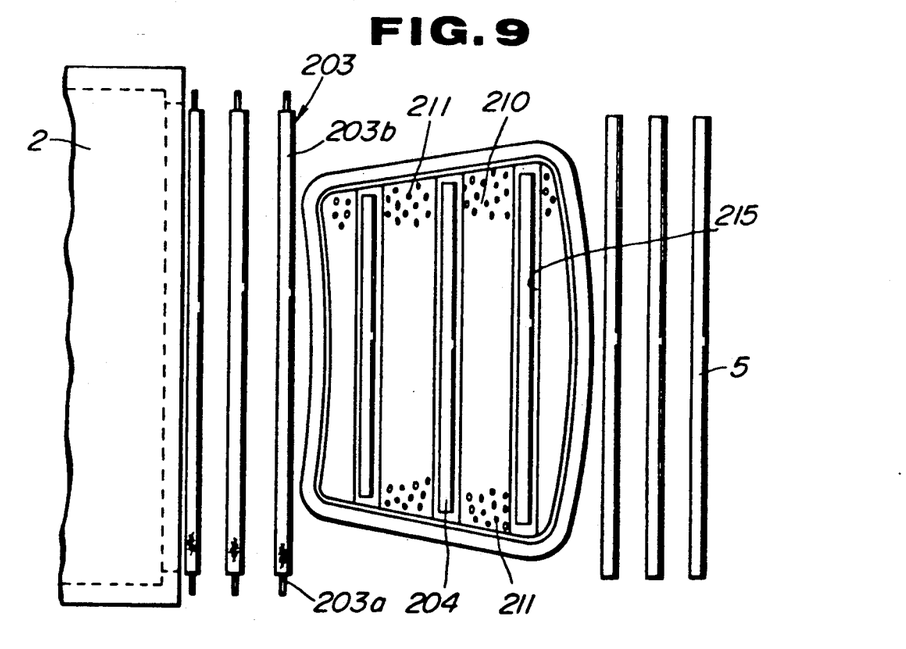
FIG. 9 is a plan view taken along line IX—IX of FIG. 8.

FIGS. 8 and 9 show a sheet glass bending and tempering apparatus 201 according to a third embodiment of the present invention.

As shown in FIG. 8, the sheet glass bending and tempering apparatus 201 has an upper convex mold member 209 and a lower concave mold member 210. A glass sheet G heated nearly to its softening point in the heating furnace 2 is transferred by feed rollers 203 onto rollers 204 in the sheet glass bending and tempering apparatus 201 which is disposed downstream of the heating furnace 2. After the glass sheet G is bent to shape and cooled quickly by the convex and concave mold members 209, 210, the glass sheet G is delivered out of the apparatus 201 by feed rollers 5.

As shown in FIG. 9, each of the feed rollers 203 comprises a core 203a curved to a shape corresponding to a bent configuration to be assumed by the glass sheet G, and a heat-resistant sleeve 203b rotatably mounted on the core 203a. The feed rollers 203 therefore serve as preliminary shaping rollers for shaping the glass sheet G while feeding the same with the sleeves 203b rotating around the respective cores 203a.

The sheet glass bending and tempering apparatus 201 also includes a means 206 for quickly cooling a peripheral edge of the glass sheet G with solid contact members, and a means 207 for quickly cooling a central region of the glass sheet G with cooling air.

Figure 10:
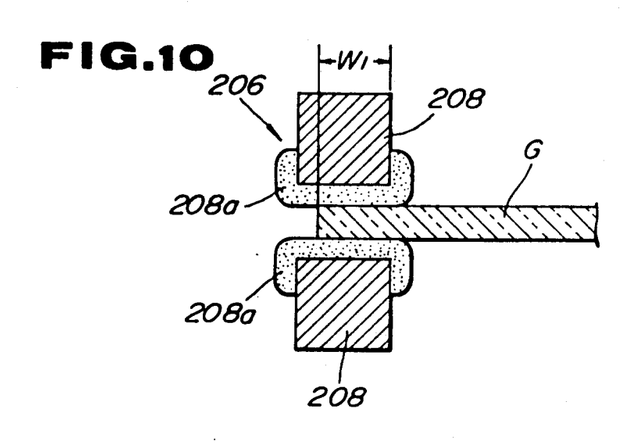
FIG. 10 is a cross-sectional view of a means for cooling a peripheral edge of a sheet of glass.

As shown in FIG. 10, the means 206 for quickly cooling glass sheet peripheral edges comprises a pair of upper and lower metallic ring mold members 208 each covered, at its confronting surface, with a surface member 208a for contacting the glass sheet G. The surface member 208a is identical in construction to the surface member 16 shown in FIG. 2. Each of the ring mold members 208 has a portion for contacting the peripheral edge of the glass sheet G, the portion having a width W1 ranging from 5 to 20 mm for ordinary automobile window glass sheets.

The means 207 for quickly cooling a central glass sheet region is composed of the convex and concave mold members 209, 210, which also serve as a means for bending the glass sheet G. The convex and concave mold members 209, 210 are hollow and connected to a source of air under pressure. Each of the convex and concave mold members 209, 210 has an air outlet ports 211 defined in its shaping or contact surface. The convex mold member 209 is vertically movable with respect to a frame 213 by a cylinder unit 212, and the concave mold member 210 is vertically movable with respect to a floor by a cylinder unit 214. The concave mold member 210 has a plurality of recesses 215 for receiving some of the feed rollers 214 when the concave mold member 210 is elevated.

The sheet glass bending and tempering apparatus 201 operates as follows: With the convex and concave mold members 209, 210 spaced from each other, a heated glass sheet G is preliminarily shaped by the feed rollers 203 and transferred onto the feed rollers 204 in the apparatus 201. Then, the peripheral edge of the glass sheet G is gripped by the ring mold members 208, and the feed rollers 204 are lowered as shown in FIG. 8. The convex mold member 209 is lowered and the concave mold member 210 is elevated to bend a central region of the glass sheet G therebetween. Simultaneously, the peripheral edge of the glass sheet G is bent by the ring mold members 208.

Thereafter, while the peripheral edge of the glass sheet G is being held by the ring mold members 208, the convex and concave mold members 209, 210 are spaced from the surfaces of the glass sheet G, and air jets are ejected from the air outlet ports 211 to cool the central region of the glass sheet G quickly. The air jets should preferably be applied to the glass sheet G while the glass sheet G gripped by the ring molds 208 is horizontally moved back and forth, so that the glass sheet G can uniformly be cooled.

At the same time that the central region of the glass sheet G is cooled quickly by air jets ejected from the air outlet ports 211, the peripheral edge of the glass sheet G is also cooled quickly by the ring molds 208. To cool the peripheral edge of the glass sheet G quickly, the ring molds 208 are pressed against the peripheral edge of the glass sheet G under a pressure in the range of from 500 to 1000 kgf, which is higher than the pressure applied to press the glass sheet G to bent shape, so that the peripheral edge of the glass sheet G is forcibly deprived of heat.

Figure 11:
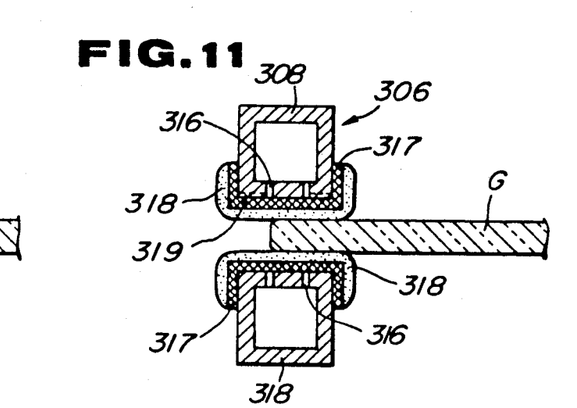
FIGS. 11 through 13 are cross-sectional view of other means for cooling a peripheral edge of a sheet of glass.
Figure 12:
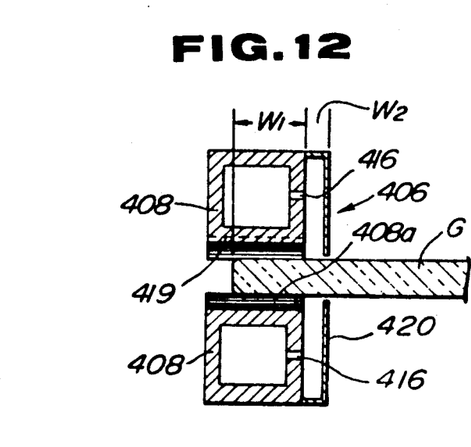
Figure 13:
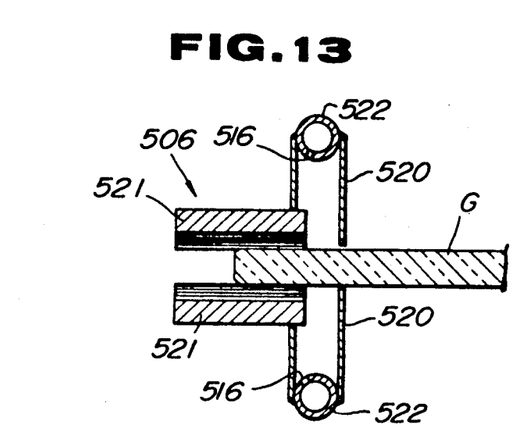

FIGS. 11 through 13 show other means 306, 406, 506, respectively, for quickly cooling the peripheral edge of a glass sheet. Each of these means 306, 406, 506 quickly cools the peripheral edge of a glass sheet with solid contact members and air jets.

In FIG. 11, each of ring mold members 308 comprises a hollow pipe of rectangular cross section which is connected to a source of air under pressure. The ring mold members 308 have nozzle holes 308 for ejecting air jets to the peripheral edge of a glass sheet G through mesh members 317 of stainless steel wires and cloth members 318 of stainless steel fibers. For a greater cooling effect, the surfaces of the ring mold members 308 which confront the glass sheet G should preferably have guide grooves 319 for guiding air jets.

In FIG. 12, each of hollow ring mold members 408 have nozzle holes 416 defined in side walls thereof, and guide plates 420 for directing air jets from the nozzle holes 416 toward the surfaces of a glass sheet G. Since air jets are not directly applied to the glass sheet G, high optical properties are imparted to the peripheral edge of the glass sheet G. The surfaces of the ring molds 408 which face the glass sheet G are covered with respective surface members 408a. The ring molds 408 are held against the glass sheet G over an interval or width W1 ranging from 5 to 20 mm. The guide plates 420 are spaced from the confronting side walls of the respective ring molds 408 by a distance W2 ranging from 5 to 10 mm, since if the distance W2 were too large, the peripheral edge of the glass sheet G would not sufficiently be cooled.

In FIG. 13, cooling plates 521 as solid contact members and pipes 422 having nozzle holes 416 for ejecting air jets are separate from each other. Air jets ejected from the nozzle holes 416 are directed toward the glass sheet G by guide plates 420.

Figure 14:
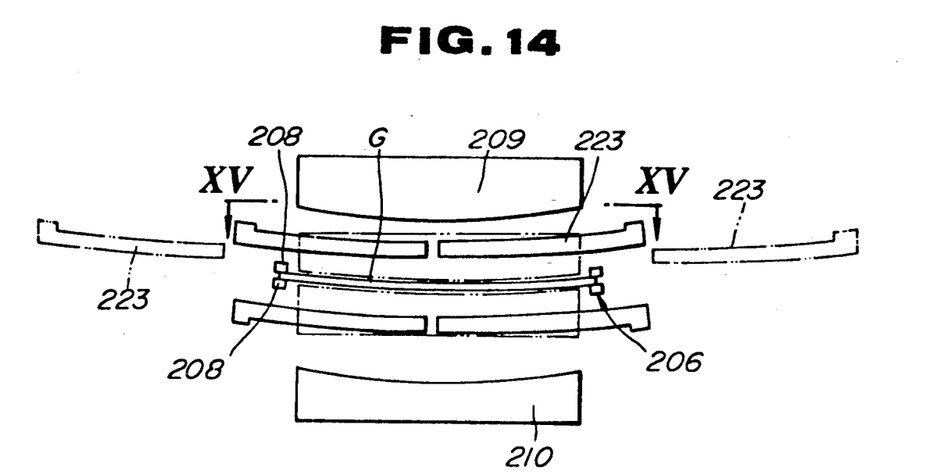
FIG. 14 is a schematic view of a sheet glass bending and tempering apparatus which has separate means for shaping and cooling a central region of a sheet of glass.
Figure 15:
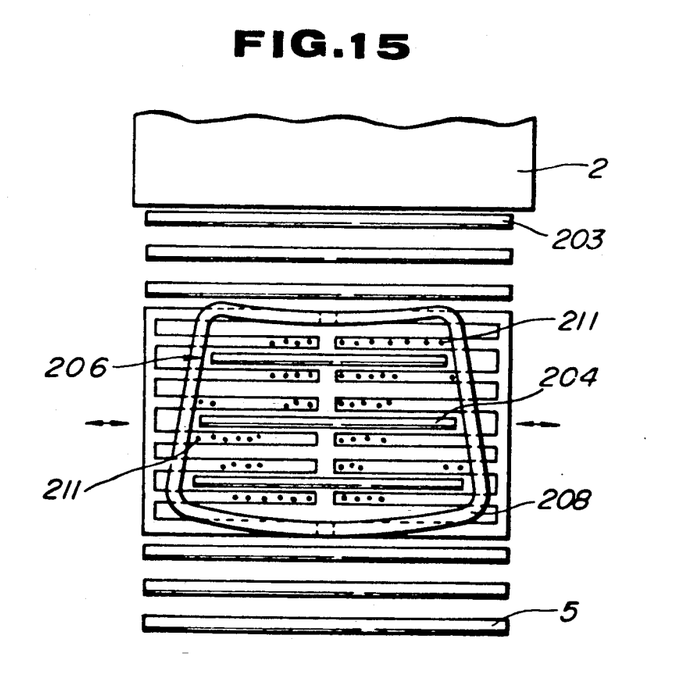
FIG. 15 is a plan view taken along line XV—XV of FIG. 14.

FIGS. 14 and 15 show a sheet glass bending and tempering apparatus according to another embodiment of the present invention.

In the embodiment shown in FIGS. 8 and 9, the means 207 for quickly cooling a central glass region is composed of the convex and concave mold members 209, 210, which also serve as a means for bending the glass sheet G. In FIGS. 14 and 15, however, the convex and concave mold members 209, 210 are used exclusively for bending a glass sheet G, and the central region of the glass sheet G is cooled by a pair of toothed cooling devices 223 disposed upwardly and downwardly, respectively, of the glass sheet G, the cooling devices 223 being movable toward and away from each other. In the embodiment shown in FIGS. 14 and 15, the central region of a glass sheet G can be bent to shape and cooled quickly in different successive steps at one stage.

While a glass sheet is bent to shape in a horizontal condition in the embodiment shown in FIGS. 14 and 15, the glass sheet may be bent in a vertical condition.

With the present invention, as described above, a sheet of glass is tempered without deformations, and air flows on the surfaces of the glass sheet which are contacted by the mold members when the glass sheet is sandwiched between the mold members. Therefore, the glass sheet is uniformly cooled, and hence tempered without mechanical strength irregularities.

The glass sheet is prevented from being broken while it is being cooled because the pressure applied to the glass sheet to shape the same is lowered before tensile stresses produced in the glass sheet upon cooling thereof exceed the mechanical strength of the glass sheet. The accuracy with which the glass sheet is bent to shape is high since a portion of the glass sheet is fixed in position when the pressure applied to the glass sheet is lowered.

The peripheral edge of the glass sheet is cooled by solid contact members or a combination of solid contact members and air jets, and the central region of the glass sheet is cooled quickly by air jets. With such a cooling arrangement, the glass sheet is bent and tempered with high shaping accuracy and reduced optical defects.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. An apparatus for shaping and tempering a glass sheet, comprising:

solid contact means for pressing a glass sheet, which has been heated nearly to a softening point thereof, to a desired shape and absorbing heat from the glass sheet to cool the glass sheet quickly, said solid contact means having a contact surface for contacting the glass sheet and absorbing heat from the glass sheet therethrough; and said contact surface having a plurality of grooves defined therein, and a plurality of air outlet port means defined in each of said grooves, for applying cooling air to the glass sheet, and a plurality of air inlet port means defined in each of said grooves, for drawing the air applied to the glass sheet.

2. An apparatus according to claim 1, wherein said grooves extend parallel to each other.

3. An apparatus according to claim 1, wherein said grooves extend across each other.

4. An apparatus according to claim 1, wherein each of said grooves has a width ranging from 2 mm to 15 mm and a depth ranging from 1 mm to 6 mm.

5. An apparatus according to claim 1, wherein said air outlet port means and said air inlet port means in each of said grooves are alternately arranged.

6. An apparatus according to claim 1, further including a mesh-like metallic sheet covering said contact surface and said grooves.

7. An apparatus according to claim 6, further including a surface member covering said mesh-like metallic sheet.

8. An apparatus according to claim 1, further including a surface member covering said contact surface and said grooves.

* * * * *